US011120531B2

(12) United States Patent
Wu et al.

(10) Patent No.: US 11,120,531 B2
(45) Date of Patent: Sep. 14, 2021

(54) METHOD AND DEVICE FOR IMAGE PROCESSING, VEHICLE HEAD-UP DISPLAY SYSTEM AND VEHICLE

(71) Applicant: BOE Technology Group Co., Ltd., Beijing (CN)

(72) Inventors: Naifu Wu, Beijing (CN); Xitong Ma, Beijing (CN); Xiangyang Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 158 days.

(21) Appl. No.: 16/470,238

(22) PCT Filed: Oct. 25, 2018

(86) PCT No.: PCT/CN2018/111905
§ 371 (c)(1),
(2) Date: Jun. 16, 2019

(87) PCT Pub. No.: WO2019/137065
PCT Pub. Date: Jul. 18, 2019

(65) Prior Publication Data
US 2020/0334795 A1    Oct. 22, 2020

(30) Foreign Application Priority Data
Jan. 12, 2018    (CN) .......................... 201810032426.3

(51) Int. Cl.
| | |
|---|---|
| *G06K 9/46* | (2006.01) |
| *G06T 5/00* | (2006.01) |
| *G06T 7/73* | (2017.01) |
| *B60K 35/00* | (2006.01) |
| *G02B 27/01* | (2006.01) |

(52) U.S. Cl.
CPC .............. *G06T 5/006* (2013.01); *B60K 35/00* (2013.01); *G02B 27/0101* (2013.01);
(Continued)

(58) Field of Classification Search
CPC .......... G02B 2027/014; G02B 27/0101; G02B 2027/011; G02B 2027/0138;
(Continued)

(56) References Cited

U.S. PATENT DOCUMENTS

| | | | |
|---|---|---|---|
| 9,619,020 B2 * | 4/2017 | George-Svahn | ...... G06F 3/0482 |
| 10,191,290 B2 | 1/2019 | Ye et al. | |

(Continued)

FOREIGN PATENT DOCUMENTS

| | | |
|---|---|---|
| CN | 101289064 A | 10/2008 |
| CN | 103792674 A | 5/2014 |

(Continued)

OTHER PUBLICATIONS

Office Action, including Search Report, for Chinese Patent Application No. 201810032426.3, dated Nov. 11, 2019, 19 pages.
(Continued)

*Primary Examiner* — Quan M Hua
(74) *Attorney, Agent, or Firm* — Westman, Champlin & Koehler, P.A.

(57) ABSTRACT

The present disclosure provides an image processing method applied to a vehicle head-up display device, including: determining position information of a target object within a range of activity; acquiring a distortion parameter corresponding to the position information by looking up a table; and performing distortion correction processing on an image to be displayed according to the distortion parameter, so as to obtain a distortion corrected image.

15 Claims, 4 Drawing Sheets

(52) U.S. Cl.
CPC ............ *G02B 27/0179* (2013.01); *G06T 7/74* (2017.01); *B60K 2370/1529* (2019.05); *B60K 2370/744* (2019.05); *G02B 2027/0138* (2013.01); *G02B 2027/0181* (2013.01); *G06T 2207/30268* (2013.01)

(58) Field of Classification Search
CPC .... G02B 2027/0159; G02B 2027/0169; G02B 27/0149; G02B 2027/0163; G02B 2027/0181; G02B 2027/0187; G02B 27/00; G02B 27/01; G02B 27/0179; G02B 2027/0112; G02B 2027/0118; G02B 2027/013; G02B 2027/0161; B60K 2370/155; B60K 35/00; B60K 2370/21; B60K 2370/334; B60K 2370/1529; B60K 2370/176; B60K 2370/23; B60K 2370/52; B60K 2370/67; B60K 2370/736; B60K 2370/744; B60K 2370/816; B60K 2370/822; B60K 2370/92; B60K 37/04; B60K 2370/152; B60K 2370/1531; B60K 2370/173; B60K 2370/179; B60K 2370/27; B60K 2370/31; B60K 2370/77; B60K 16/0373; B60K 1/00; B60K 2300/102; B60K 2300/105; B60K 2300/205; B60K 2300/30; B60K 2300/304; B60K 2300/607; B60K 2300/802; B60K 2300/8046; B60K 2300/806; B60K 2300/8066
See application file for complete search history.

(56) References Cited

U.S. PATENT DOCUMENTS

| | | | |
|---|---|---|---|
| 2008/0088528 A1* | 4/2008 | Shindo | G02B 27/01 345/7 |
| 2008/0089611 A1* | 4/2008 | McFadyen | G06T 5/006 382/289 |
| 2008/0165084 A1* | 7/2008 | Giegold | G06T 5/006 345/7 |
| 2015/0138047 A1 | 5/2015 | Hwang et al. | |
| 2016/0035144 A1 | 2/2016 | Adimoolam et al. | |
| 2016/0048866 A1* | 2/2016 | Li | G06K 9/00604 705/14.41 |
| 2016/0235291 A1* | 8/2016 | Goh | A61B 3/0091 |
| 2016/0368417 A1 | 12/2016 | Bassi et al. | |
| 2017/0329142 A1 | 11/2017 | Ye et al. | |
| 2019/0163268 A1* | 5/2019 | Shin | G06F 1/163 |
| 2019/0227310 A1 | 7/2019 | Wang et al. | |

FOREIGN PATENT DOCUMENTS

| | | |
|---|---|---|
| CN | 104656253 A | 5/2015 |
| CN | 204731990 U | 10/2015 |
| CN | 105323377 A | 2/2016 |
| CN | 105527710 A | 4/2016 |
| CN | 105700136 A | 6/2016 |
| CN | 105774679 A | 7/2016 |
| CN | 106226905 A | 12/2016 |
| CN | 106226910 A | 12/2016 |
| CN | 106446801 A | 2/2017 |
| CN | 206332777 U | 7/2017 |
| CN | 107272194 A | 10/2017 |
| CN | 108171673 A | 6/2018 |

OTHER PUBLICATIONS

International Search Report and Written Opinion (including English translation of search report and Box V of Written Opinion) for International Application No. PCT/CN2018/111905, dated Jan. 28, 2019, 14 pages.

* cited by examiner

METHOD AND DEVICE FOR IMAGE PROCESSING, VEHICLE HEAD-UP DISPLAY SYSTEM AND VEHICLE

CROSS-REFERENCE TO RELATED APPLICATION(S)

This application is a Section 371 National Stage application of International Application No. PCT/CN2018/111905, filed Oct. 25, 2018, and claims priority to Chinese Application No. 201810032426.3, entitled "METHOD AND DEVICE FOR IMAGE PROCESSING, VEHICLE HEAD-UP DISPLAY SYSTEM AND VEHICLE" filed on Jan. 12, 2018, the contents of which are incorporated herein by reference in their entireties.

TECHNICAL FIELD

The present disclosure relates to the fields of image processing, positioning and vehicle, and in particular, to a method and a device for image processing, a vehicle head-up display system and a vehicle apparatus.

BACKGROUND

The Head-Up Display (HUD) can display important information on a piece of transparent glass in front of the line of sight. It was first applied to fighters, which allows the pilots not necessary to focus on looking down at the data on the dashboard frequently, so as to avoid that the pilots cannot observe environmental information in the area in front of the fighter while viewing the data on the dashboard.

SUMMARY

According to a first aspect of the present disclosure, an image processing method applied to a vehicle head-up display device is provided. The image processing method includes: determining position information of a target object within a range of activity; acquiring a distortion parameter corresponding to the position information by looking up a table; and performing distortion correction processing on an image to be displayed according to the distortion parameter, so as to obtain a distortion corrected image.

According to an embodiment of the present disclosure, prior to said determining the position information of the target object within the range of activity, the image processing method further includes:
storing position information in the range of activity in association with a distortion parameter corresponding to the position information.

According to an embodiment of the present disclosure, said storing position information in the range of activity in association with a distortion parameter corresponding to the position information includes:
determining capturing position information of a mobile camera device within the range of activity;
acquiring a distortion parameter corresponding to the capturing position information, and storing the capturing position information in association with the corresponding distortion parameter; and
moving the mobile camera device within the range of activity, so as to store position information within the range of activity in association with a distortion parameter corresponding to the position information.

According to an embodiment of the present disclosure, said determining the capturing position information of the mobile camera device within the range of activity includes:
capturing, by a fixed camera device, a first image of the mobile camera device within the range of activity;
parsing the first image to determine imaging position information of the mobile camera device in an imaging plane of the fixed camera device; and
converting the imaging position information to determine the capturing position information of the mobile camera device within the range of activity.

According to an embodiment of the present disclosure, said acquiring the distortion parameter corresponding to the capturing position information includes:
capturing a test image by the mobile camera device; and
comparing the test image with a reference image to acquire the distortion parameter corresponding to the capturing position information.

According to an embodiment of the present disclosure, said storing the capturing position information in association with the corresponding distortion parameter further includes:
storing the capturing position information and the corresponding distortion parameter in a lookup table.

According to an embodiment of the present disclosure, the range of activity is an area in which the image to be displayed can be viewed by the target object when it is displayed on a display carrier.

According to an embodiment of the present disclosure, prior to said determining the position information of the target object within the range of activity, the method includes:
detecting whether there is a target object within the range of activity; and
in response to detecting that there is a target object within the range of activity, capturing an image including the target object.

According to an embodiment of the present disclosure, said detecting whether there is a target object within the range of activity further includes:
sensing, by a sensor, whether there is a target object within the range of activity.

According to an embodiment of the present disclosure, the sensor includes one or more of an infrared sensor and a gravity sensor.

According to an embodiment of the present disclosure, the image processing method further includes:
displaying the distortion corrected image on a display carrier by projection.

The present disclosure further provides an image processing device, including:
a determining module configured to determine position information of a target object within a range of activity;
an acquisition module, configured to acquire a distortion parameter corresponding to the position information by looking up a table; and
a processing module, configured to perform distortion correction processing on an image to be displayed according to the distortion parameter, so as to obtain a distortion corrected image.

The present disclosure further provides an image processing device, including a processor and a memory having a computer program stored therein, the computer program, when executed by the processor, implements steps of the image processing method according to any of the technical solutions.

According to an embodiment of the present disclosure, the memory stores a lookup table, which associates the position information within the range of activity and the corresponding distortion parameter.

The present disclosure further provides a vehicle head-up display system, including a fixed camera device, a display carrier and the image processing device as previously described, wherein the fixed camera device is configured to capture a second image including the target object, the image processing device is configured to determine the position information of the target object according to the second image, acquire the distortion parameter corresponding to the position information by looking up the table, and perform the distortion correction processing on the image to be displayed according to the distortion parameter so as to obtain the distortion corrected image, and the display carrier is configured to display the distortion corrected image.

According to an embodiment of the present disclosure, the vehicle head-up display system further includes a mobile camera device configured to capture a test image when the mobile camera device moves within the range of activity, wherein the image processing device is configured to compare the test image with a reference image to acquire a distortion parameter corresponding to the capturing position information where the mobile camera device captures the test image.

The present disclosure further provides a vehicle including the image processing device as previously described; or the vehicle head-up display system as described in any of the technical solutions.

BRIEF DESCRIPTION OF THE DRAWINGS

The above and/or additional aspects and advantages of the present disclosure will become apparent and readily understood from the following descriptions in conjunction with the drawings, in which.

DETAILED DESCRIPTION

Figure 1:
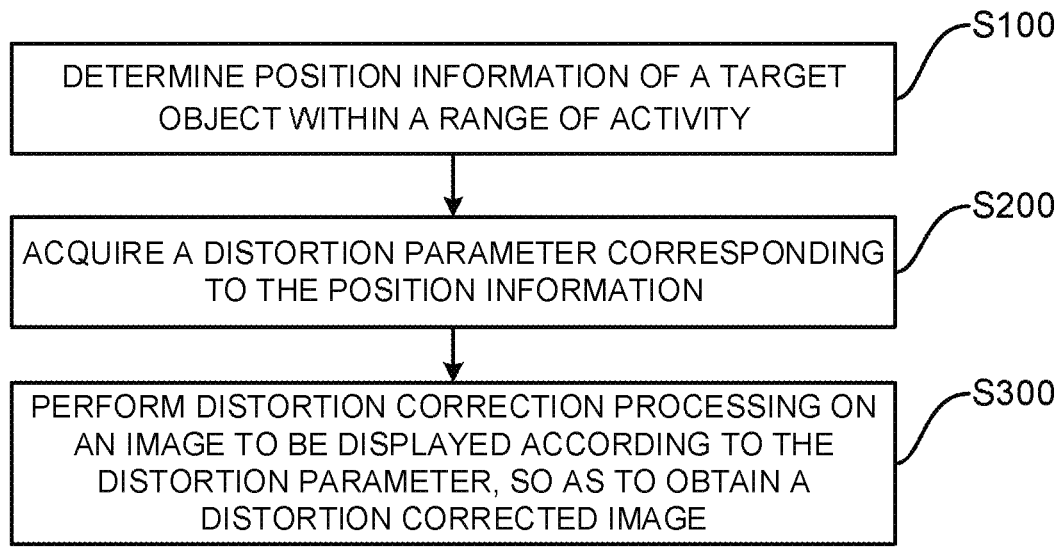
FIG. 1 is a flowchart of an exemplary embodiment of an image processing method according to the present disclosure.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the drawings are illustrative only for explaining the present disclosure, but are not to be construed as limiting the present disclosure.

It is to be understood by the skilled in the art that the singular forms "a", "an", "the" and "said" may include the plural forms, unless otherwise specified. It should be further understood that the phrase "comprise" used in the description of the present disclosure means that there are the features, integers, steps, operations, elements, and/or components, but does not exclude one or more other features, integers, steps, operations, elements, components and/or groups thereof. It should be understood that when it is described that an element is "connected" to another element, it may be connected to the other element directly or via an intermediate element. In addition, "connected" as used herein may include connected in a wireless way. The phrase "and/or" used herein includes all or any one of one or more associated listed items and all combinations thereof.

The skilled in the art will appreciate that all terms (including technical and scientific terms) used herein have the same meanings as commonly understood by the skilled in the art to which the present disclosure belongs, unless otherwise defined. It should also be understood that the terms such as those defined in a general dictionary should be understood to have meanings consistent with the meanings in the context of the prior art, and will not be explained in idealized or overly formal meanings, unless specifically defined herein.

The Head-Up Display (HUD) was first applied to fighters, which allows the pilots not necessary to focus on looking down at the data on the dashboard frequently, so as to avoid that the pilots cannot observe environmental information in the area in front of the fighter while viewing the data on the dashboard.

With the development of the automobile industry and the situation of roads of our country, the driver often needs to focus on observing the environmental information during driving, and thus cannot look down at the meter information on the dashboard, which may lead to rapid driving and violate traffic rules; or, the driver cannot observe the environmental information while paying attention to the meter information, which may cause a traffic accident.

According to an embodiment of the present disclosure, the HUD can be applied to a vehicle.

As shown in FIG. 1, an image processing method applied to a vehicle head-up display device according to an embodiment of the present disclosure includes steps S100 to S300.

In S100, position information of a target object within a range of activity is determined.

Figure 2:
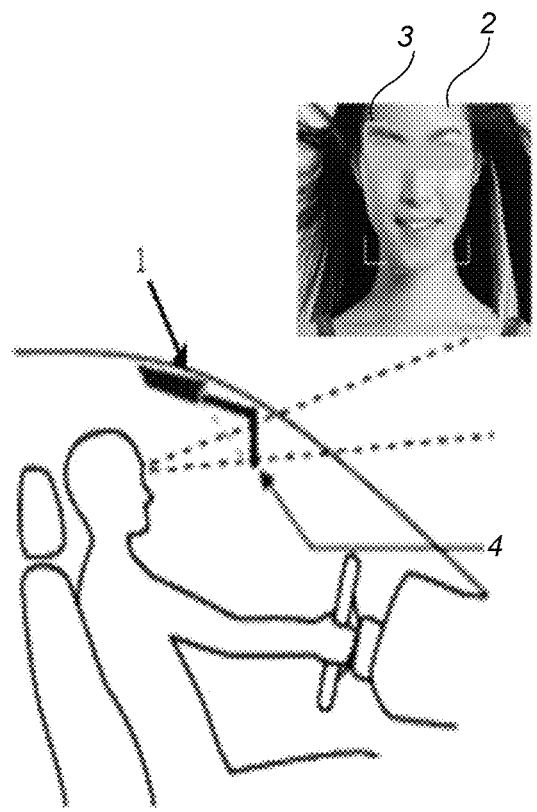
FIG. 2 is a schematic view showing a position of a fixed camera device and a position of a driver's head in a vehicle according to the present disclosure.

First, referring to FIG. 2, a target object 3 has a determined position in a vehicle compartment, and the range in which the target object 3 moves within the vehicle compartment is limited. FIG. 2 also shows a position of a fixed camera device 1 in the vehicle compartment, wherein the broken lines show lines of sight of the target object 3 in viewing an image to be displayed when it is displayed on a display carrier 4. An image at the upper right corner of FIG. 2 is an image 2 including the target object captured by the fixed camera device 1. A range of activity is set, and the range of activity includes a maximum range of a moving area of the target object, in which the target object can view the image to be displayed when it is displayed on the display carrier. In order to better determine the position of the target object, a coordinate system of the fixed camera device 1 is established with an optical center of the fixed camera device being the coordinate origin, so as to determine the position information of the target object in the coordinate system of the fixed camera device, i.e., to determine coordinate value of the target object in the coordinate system of the fixed camera device, wherein the position information is real-time coordinate value, and when the target object is at the position having the coordinate value, an image of the target object being in the range of activity can be captured. In the early stage, the target object is simulated by a mobile camera device in the range of activity, capturing position information of the mobile camera device at different position points is determined by the fixed camera device, the capturing position information being coordinate value in the coordinate system of the fixed camera device. After the capturing position information of the mobile camera device at the different position points is determined, the capturing position information of each position point and a distortion parameter of the mobile camera device at each position point are stored in a mapping relationship. Since the mobile camera device is used for simulating the target object, the capturing position information of the mobile camera device may be found from the position information of the corresponding target object after the position information of the target object is determined, so as to acquire the corresponding distortion parameter according to the capturing position information as described later. It should be noted that, according to an embodiment of the present disclosure, the target object may be eyes of the driver.

Specifically, the process of determining the position information of the target object includes: first, as shown in FIG. 2, capturing a second image 2 including the target object 3 by the fixed camera device 1, detecting the feature of the target object 3 in the second image 2, and determining the position information of the target object in the coordinate system of the fixed camera device based on data of the target object 3 in the imaging plane of the fixed camera device 1 (such as position information and pixel information in the imaging plane), an internal parameter (such as a focal length) and an external parameter (such as installed position information of the fixed camera device 1, a positional relationship within the range of activity, and the like) known to the fixed camera device 1, and a distance conversion relationship between the coordinate value of the fixed camera coordinate system and the imaging plane. Specifically, an image coordinate system is established in the imaging plane of the fixed camera device 1, the origin of this coordinate system and the origin of the coordinate system of the fixed camera device are on the same straight line, that is, the two coordinate systems have one and the same coordinate axis, the focal length of the fixed camera device is fixed, and the internal parameter and the external parameter of the fixed camera device are known. Thus, it can be determined that there is a fixed ratio between the coordinate value of a point in the coordinate system of the fixed camera device and the coordinate value of the corresponding point in the imaging plane. The ratio is particularly related to the camera device used, and is suitable for all the corresponding points in the coordinate system of the fixed camera device and the coordinate system of the imaging plane. When the target object is imaged in the imaging plane, the position information of the target object in the imaging plane (the coordinate value in the coordinate system of the imaging plane) may be detected, and this value is converted according to the focal length and the fixed ratio to determine the coordinate value of the target object in the coordinate system of the fixed camera device, that is, the position information of the target object.

In S200, a distortion parameter corresponding to the position information is acquired by looking up a table.

As analyzed in step S100, the coordinate value of the target object in the coordinate system of the fixed camera device is determined. Since coordinate values of the coordinate system of the fixed camera device and distortion parameters are stored in the mapping relationship, the distortion parameter may be acquired according to the coordinate value after the coordinate value of the target object in the coordinate system of the fixed camera device is determined, which distortion parameter is to be used for subsequent image correction processing, thereby saving time for image distortion processing, and the distortion corrected display image can be displayed on the display carrier more quickly. Specifically, the target object is the driver's eyes. The coordinate value of the driver's eyes in the coordinate system of the fixed camera device is determined in step S100, and the distortion parameter corresponding to the coordinate value is acquired by looking up the table according to the mapping relationship between the coordinate values of the coordinate system of the fixed camera device and the distortion parameters, which distortion parameter will be used in the subsequent image correction processing. During the acquisition of the distortion parameter, the distortion parameter corresponding to the coordinate value can be directly acquired by looking up the table according to the mapping relationship between coordinate values and distortion parameters, thereby saving the processing time of the entire image display process. The image to be displayed can be displayed on the display carrier, such as a transparent window, more quickly. This improves the safety of the driver during his driving, thereby reducing the traffic accident that occurs when the driver views the meter data.

S300: distortion correction processing is performed on an image to be displayed according to the distortion parameter, so as to obtain a distortion corrected image.

The distortion parameter of the image to be displayed is acquired by the foregoing steps S100 and S200, and then the distortion correction process is performed on the image to be displayed, wherein the distortion parameter is a two-dimensional coordinate value. In the distortion correction process, after the distortion parameter for correction is acquired, each pixel point in the image to be displayed is correspondingly moved according to the distortion parameter. Specifically, the image to be displayed is mapped to the imaging plane of the mobile camera device. Like the fixed camera device previously discussed, a coordinate system is also established in the imaging plane of the mobile camera device. The image to be displayed before correction is an image in a case where the image to be displayed is viewed by the mobile camera device straightly. During the correction, the image to be displayed is correspondingly moved in the imaging plane (the coordinate system of the imaging plane) of the mobile camera device according to the value of the distortion parameter. Of course, in order to reduce the error of the correction in the process, the distortion parameters for correction may be acquired according to methods, such as high-order analysis, interpolation algorithms, iterative algorithms, etc. For example, a high-order analysis model is given as:

$$\begin{bmatrix} x_p \\ y_p \end{bmatrix} = (1 + k_1 r^2 + k_2 r^4 + k_3 r^6) \begin{bmatrix} x_d \\ y_d \end{bmatrix} + \begin{bmatrix} 2 p_1 x_d y_d + p_2 (r^2 + 2 x_d^2) \\ p_1 (r^2 + 2 y_d^2) + 2 p_2 x_d y_d \end{bmatrix},$$

wherein $k_1$, $k_2$, and $k_3$ respectively represent the first, second and third order distortion parameters of radial distortion of the mobile camera device, $p_1$ and $p_2$ represent distortion parameters of tangential distortion of the mobile camera device, $(x_d, y_d)$ represents a coordinate value of a point of the image to be displayed before correction in the imaging plane of the mobile camera device, $(x_p, y_p)$ represents a coordinate value of the point in the imaging plane of the mobile camera device after the distortion correction processing is performed on the image to be displayed, and r represents a distance of the point whose coordinate value is $(x_d, y_d)$ from a center point of the imaging plane of the mobile camera device. The mobile camera device is mainly used to simulate the position of the driver's eyes in the vehicle compartment, and the distortion parameter of the mobile camera device is acquired by the calibration method and the distortion model. After the simulation is completed, the mobile camera device is not used. In the description below, the camera device corresponding to the distortion parameter is a mobile camera device that simulates the target object.

The distortion corrected image is displayed on the display carrier. The display carrier is a transparent window on the vehicle, and may be a windshield mounted in front of the driver's head. Of course, the display carrier may be other terminal devices or particles, such as water molecules in the air, for display. In the process of displaying the image to be displayed on the display carrier, the position on the display carrier on which the image to be displayed is displayed is fixed.

By performing the distortion correction on the image, a visual difference brought to the driver when the image is displayed may be reduced even if the driver views the image that is displayed on the display carrier at different angles of view. After the distortion correction, the image is subjected to other processing, such as gray processing, to facilitate the generation of the distortion corrected image, and then the image after the complete distortion correction processing is displayed on the display carrier. The display method includes a projection method. The projection method has a higher color reproduction degree and has a better visual effect, thereby making the displayed image more conformable to the real object. Specifically, as described above, the target object is the eyes of the driver, and the display carrier is the window of the vehicle. As described above, after the distortion correction of the image to be displayed on the vehicle window is performed, the image to be displayed is normalized, such as smoothing processing, enhanced processing, gray processing, etc., and the normalized image is projected on the transparent window of the vehicle by projection at a position corresponding to the driver's eyes, thereby realizing the function of head-up display. Thus, the driver can simultaneously notice the environmental information and the driving vehicle information while he is driving the vehicle. In an embodiment of the present disclosure, in the process of performing the distortion correction processing on the image to be displayed, a process of performing other normalization processing on the image to be displayed is also included. Although this process is not described in detail herein, it can be understood and implemented by the skilled in the art, and its main purpose is to enable the image to be displayed on the display carrier more realistically and clearly.

Further, in an implementation, prior to the step of determining the position information of the target object, the method includes:

storing position information in the range of activity in association with a distortion parameter corresponding to the position information.

Figure 3:
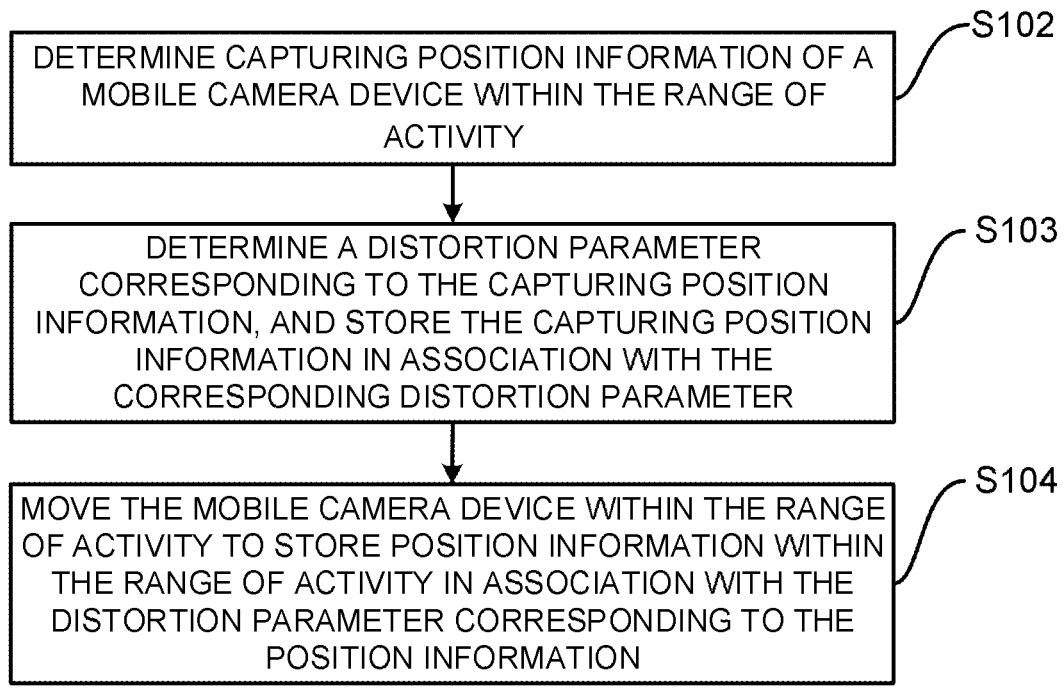
FIG. 3 is a flowchart of another embodiment of an image processing method according to the present disclosure.

Further, in an implementation, the step of storing position information in the range of activity in association with a distortion parameter corresponding to the position information as shown in FIG. 3 includes S102 to S104.

In S102: capturing position information of the mobile camera device in the range of activity is determined.

In S103: a distortion parameter corresponding to the capturing position information is acquired, and the capturing position information is stored in association with the corresponding distortion parameter.

In S104: the mobile camera device moves within the range of activity to store position information within the range of activity in association with a distortion parameter corresponding to the position information.

Said storing the capturing position information in association with the corresponding distortion parameter may further include: storing the capturing position information and the corresponding distortion parameter in a lookup table.

Figure 4:
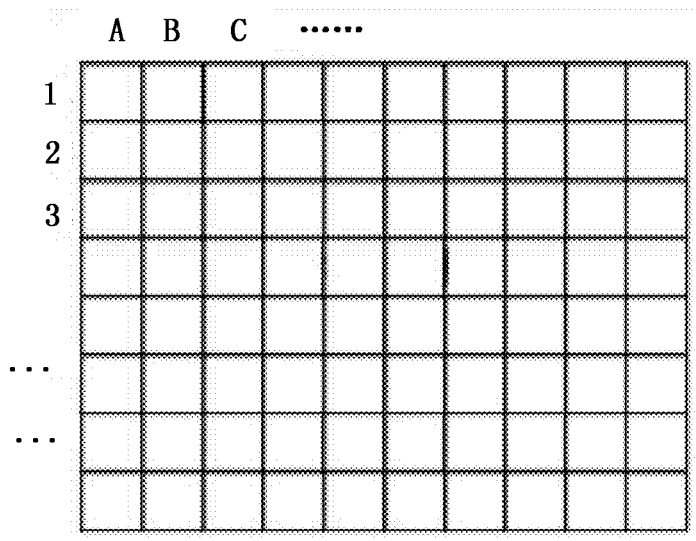
FIG. 4 illustrates an area division diagram of a range of activity in an embodiment of the present disclosure.
Figure 5:
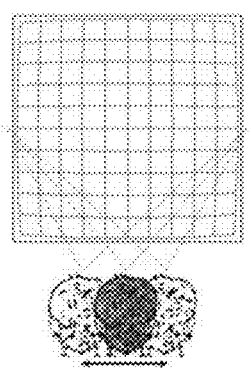
FIG. 5 illustrates a range of activity corresponding to a target object in an embodiment of the present disclosure, mainly showing a range of angles of view that a driver can view an image displayed on a display carrier.

In an embodiment of the present disclosure, the mobile camera device is used to simulate that the target object moves in the vehicle compartment. Since the driver is in the driving position, the range of movement of his eyes or head is limited, i.e., in a relatively fixed range of movement (i.e., the range of activity as described previously) when he is observing the environmental information in front of the vehicle, as shown in FIGS. 4 and 5. Therefore, when the mobile camera device simulates the target object, it moves within the range of activity. As described above, the mobile camera device has different distortion parameters at different positions. Hence, the mobile camera device is captured by the fixed camera device that determines the position information of the target object, and capturing position information of the mobile camera device within the range of activity is determined according to the image of the mobile camera device captured by the fixed camera device. The particular process is consistent with the process of determining the position information of the target object as described previously, and thus description thereof will be omitted here. In addition, since the mobile camera device has different distortion parameters at different positions, when the capturing position information of the mobile camera device is determined by the fixed camera device, the distortion parameter corresponding to the capturing position information is acquired, and the distortion parameter and the capturing position information of the mobile camera device corresponding to the distortion parameter are stored in association with each other (for example, in the form of a lookup table). Therefore, when determining position information of the target object, the capturing position information of the mobile camera device that is the same as the position information or within an error tolerance range of the position information can be retrieved, and then the distortion parameter corresponding to the capturing position information is acquired by looking up the table as the distortion parameter of the target object, so as to perform the distortion correction on the image to be displayed. Specifically, the model for determining the distortion parameter has been described above. In addition, Zhang Zhengyou's image calibration model, a Tasi distortion model, a model including radial distortion and tangential distortion, a nonlinear mathematical distortion model, and a linear mathematics distortion model etc. may also be used. The foregoing models are all determined based on a deviation of position information of a test image and a reference image in the imaging plane of the mobile camera device.

Preferably, in order to quickly retrieve the distortion parameter, the distortion parameter and the position information of the mobile camera device are stored in a database in a mapping relationship (for example, in a lookup table), and the database may be in a local device, such as a micro control unit. The database may also be a cloud database and/or a removable storage medium coupled to the local device. Of course, in order to enable the local device to perform image processing quickly, the distortion parameter and the position information of the mobile camera device may also be stored in other mobile storage media connected to the local database, such as in a mobile terminal (such as a mobile phone, a tablet, etc.), or in a cloud database. The cloud database may be connect directly to the local database or connected indirectly to the local database through other terminal devices. Of course, the distortion parameter and the position information of the mobile camera device may be stored simultaneously in any one or more of a local database, a cloud database, and a removable storage medium.

Further, the step of determining the capturing position information of the mobile camera device within the range of activity may include:

capturing, by the fixed camera device, a first image of the mobile camera device within the range of activity;

parsing the first image to determine imaging position information of the mobile camera device in an imaging plane of the fixed camera device; and converting the imaging position information to determine the capturing position information of the mobile camera device within the range of activity.

The imaging position information may be converted based on a preset rule.

The preset rule includes one of a homogeneous equation model, a small hole imaging model, and a SIFT operation rule.

As described above, the mobile camera device is used to simulate that the target object moves within the range of activity of the target object. Therefore, the capturing position information of the mobile camera device is equivalent to the position information of the target object, so as to acquire the distortion parameters of the target object at different positions. Therefore, in the later stage, corresponding distortion parameters of the target object at different positions can be retrieved, and distortion correction is performed on the image to be displayed, so that the difference in the image displayed on the display carrier viewed by the target object at different positions is smaller, and thus the driver may determine current vehicle information better. Therefore, as described above, in the earlier stage, the moving image (the first image) of the mobile camera device moving in the range of activity is captured by the fixed camera device, that is, when the mobile camera device is in one position, the fixed camera device captures at least one frame of the moving image, parses the moving image and determines the position information of the mobile camera device in the moving image. In particular, the imaging position information of the mobile camera device in the imaging plane of the fixed camera device is parsed; as described above, the coordinate value (the coordinate value in the image coordinate system) of the mobile camera device in the imaging plane of the fixed camera device is determined; the imaging position information is converted according to the ratio between the coordinate value of a point in the coordinate system of the fixed camera device and the coordinate value of the corresponding point in the imaging plane, and thus the coordinate value of the mobile camera device in the coordinate system of the fixed camera device is determined as the capturing position information of the mobile camera device moving within the range of activity. The ratio between the coordinate value of a point in the coordinate system of the fixed camera device and the coordinate value of the corresponding point in the imaging plane is determined based on a preset rule, which will be described in detail later.

Specifically, in order to have the conversion of the position information of the mobile camera device in the imaging plane of the fixed camera device to the coordinate value in the coordinate system of the fixed camera device more accurate with a smaller error, that is, to make the ratio between the coordinate value of a point in the coordinate system of the fixed camera device and the coordinate value of the corresponding point in the imaging plane of the fixed camera device more accurate, the ratio is determined based on the homogeneous equation in an embodiment of the present disclosure. In a specific process, the homogeneous equation is expressed in a form of a matrix given as:

$$\rho \begin{bmatrix} x \\ y \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} X_C \\ Y_C \\ Z_C \\ 1 \end{bmatrix},$$

wherein (x, y) is a coordinate value of a certain point in the imaging plane of the fixed camera device, (Xc, Yc, Zc) is a coordinate value of a certain point in the coordinate system of the fixed camera device, f is a distance between an origin of the coordinate system of the fixed camera device and an origin in the imaging plane, that is, a focal length of the fixed camera device, and p is a constant factor. The coordinate value of the mobile camera device in the coordinate system of the fixed camera device may be determined according to the conversion matrix.

The aperture imaging model is based on the principle that light travels along a straight line. That is, a point in space, an optical center of a camera device, and an image of the point in space in the imaging plane of the camera device constitute a straight line. The light emitted by an object passes through the optical center of the camera device, and is then imaged in the imaging plane. If the distance between the plane where the object is located and the plane where the camera device is located is assumed to be d, the actual height of the object is H, the height of the object in the imaging plane is h, and the focal length is f, then $f/d = h/H.$ The basis of the model is that f, d, and H are known, and the distance between the object and the imaging plane is obtained according to the model. According to the ratio relationship between the distances and based on the equal proportional relationship of the similar triangles, after the coordinates of the object in the imaging plane is determined, the two-dimensional position information of the object in the coordinate system of the camera device may be determined according to the ratio. By adding H to the coordinates, the position information in the coordinate system of the camera device can be obtained. Specifically, in an embodiment of the present disclosure, the object is replaced with the mobile camera device or the target object, and the camera device is replaced with the fixed camera device.

SIFT is based on feature point extraction. A feature point of a corresponding feature in the target object is determined based on at least two frames of images. The SIFT feature not only has a scale invariance attribute, but even if the rotation angle, image brightness or shooting angle changes, a good detection result may be obtained. The SIFT feature point extraction process includes: 1. Since the Gaussian convolution kernel is the only linear kernel that implements scale transformation, convoluting the image with Gaussian convolution kernels with different scales to generate a Gaussian difference scale space, that is, an image pyramid; 2. detecting an extreme point of a DOG scale space, and determining a feature point of the image at this scale; 3. using an approximate Harris Corner detector to accurately determine a position and a scale of a key point (to achieve sub-pixel accuracy) by fitting a three-dimensional quadratic function, while removing a key point with a lower contrast and a unstable edge response point to enhance the matching stability and improve the anti-noise ability; 4. taking one direction for each determined feature point in each image, performing further calculation along this direction, and specifying a direction parameter for each key point according to a gradient direction distribution characteristic of neighboring pixels of the key point, so that the operator has a rotation invariance attribute; 5. rotating the coordinate axis to the direction of the key point to ensure the rotation invariance; deriving a gradient magnitude and a gradient direction of each pixel based on the formula, wherein the direction of the arrow represents the gradient direction of the pixel, and the length of the arrow represents the gradient modulus; and then performing a weighting operation using the Gaussian window. 6. matching the generated images according to SIFT, descriptors of respective scales (all the scales) in the two images being matched, and matching 128-dimension representing that the two feature points are matched, that is, matching the feature points in different frames of image data, wherein the matching may be matching the feature points in the image data of adjacent frames, or matching the feature points in the image data of spaced frames. Based on the foregoing, the coordinate value of the target object in the coordinate system of the fixed camera device may be determined in conjunction with an RANSAC algorithm. The RANSAC algorithm includes: 1. randomly extracting 4 sample data (which are not collinear) from a data set to calculate a transformation matrix H, which is referred to as model M; 2. calculating projection errors between all the data in the data set and the model M; if the error is less than a threshold, adding an inner point set I to the data set; 3. if the number of elements in the current inner point set is greater than that in an optimal inner point set, updating the optical inner point set with the current inner point set, and meanwhile updating the number of iterations k; 4. exiting if the number of iterations is greater than k; otherwise, incrementing the number of iterations by 1; and repeating the above steps to obtain the feature points that are matched correctly; estimating motion parameters, i.e., the positions of the feature points in the image data in the next one or more frames, according to variation of the feature points in the image data; and unifying the feature points that are matched correctly in all the frames in the aforementioned coordinate system to determine the position information of the target object. Of course, the process is also applicable to determining the coordinate value of the target object in the coordinate system of the fixed camera device based on the image including the target object that is captured by the fixed camera device.

Further, the step of acquiring the distortion parameter corresponding to the capturing position information includes:

capturing a test image by the mobile camera device; and comparing the test image with a reference image to acquire the distortion parameter corresponding to the capturing position information.

The mobile camera device has different distortion parameters at different positions. Therefore, in order to obtain the distortion parameter of each point in the range of activity, when the mobile camera moves to a position, which is the capturing position where the mobile camera device simulates the target object, the mobile camera device captures at least one frame of test image at the capturing position, and the test image is an image captured by the mobile camera device when the mobile camera device simulates the target object to view a captured object (i.e., the display carrier or the position on the display carrier at which the image to be displayed is displayed) at this position, the test image is compared with the reference image to determine a deviation of each pixel point in the test image from each pixel point in the reference image, the deviation being the distortion parameter in the embodiments of the present disclosure. Specifically, for example, the captured object in the test image and the reference image is a checkerboard, wherein the reference image is an image generated when the driver's eyes are right facing the display carrier (for example, the center of the display carrier), and the test image is an image viewed by the driver when the driver looking toward the display carrier but does not directly looking at the checkerboard on the display carrier, and both the test image and the reference image are images captured by the mobile camera device when the mobile camera device simulates the target object to view the checkerboard displayed on the display carrier. For convenience of comparison, the object in the reference image and the object in the test image are the same, and the positions of the respective objects are also in one-to-one correspondence to achieve comparison between the test image and the reference image. Specifically, during the comparison, the test image and the reference image in the imaging plane of the mobile camera are compared to determine the deviation therebetween. As described previously, in such a process, a coordinate system (image coordinate system) is established in the imaging plane of the mobile camera device; since the plane where the optical center of the camera device is located is considered to be parallel to the imaging plane during the operation, and the origin in the imaging plane is typically a point at which the optical center is vertically projected on the imaging plane, there is the same reference point, i.e., the origin in the imaging plane, during the process of determining the distortion parameter. During the comparison, all or part of the pixel points on the test image and the reference image are compared one by one, and a specific distortion parameter is determined based on the obtained distortion parameter by the iterative algorithm, high-order analysis or difference algorithm. For the specific high-order analysis, such as the high-order analysis model in the foregoing, a plurality of pairs of corresponding coordinate values are obtained on the test image and the reference image and substituted to the high-order analysis model to acquire the distortion parameter. In the process of comparing all or part of the pixel points on the test image and the reference image one by one, the pixel points of the one-to-one corresponding features of the same object on the test image and the reference image are mainly compared.

Preferably, a plurality of sets of capturing position information and distortion parameters corresponding to the capturing position information are included.

In order to enable the target object to have different distortion parameters at different positions and thereby to enable the difference in the image displayed on the display carrier viewed at the respective positions to be smaller, when the mobile camera device simulates the target object, the fixed camera device captures at least one frame of a moving image of the mobile camera device at different positions within the range of activity to determine the position information of the mobile camera device within the range of activity, and the distortion parameters corresponding to the different positions of the mobile camera device are acquired, so that each position has a corresponding distortion parameter, and thus the position information at each position has a corresponding distortion parameter.

The storing the capturing position information in association with the corresponding distortion parameter further includes:

storing the capturing position information and the corresponding distortion parameter in a lookup table.

Before the step of determining the position information of the target object within the range of activity, the method may further include:

detecting whether there is a target object within the range of activity; and in response to detecting that there is a target object within the range of activity, capturing a second image including the target object.

Specifically, said detecting whether there is a target object within the range of activity further includes: sensing, by a sensor, whether there is a target object within the range of activity. According to an embodiment of the present disclosure, the sensor includes one or more of an infrared sensor and a gravity sensor.

When it is detected that there is a target object within the range of activity, the second image including the target object is captured by the fixed camera device, and the position information of the target object within the range of activity is determined. In order to be able to determine the position information of the target object in the coordinate system of the fixed camera device, the present disclosure utilizes a tracking and positioning method using a fixed camera device, that is, using the fixed camera device to capture at least one frame of image, in which the target object is within the range of activity. The position information of the target object in the coordinate system of the fixed camera device is determined based on the image. The present disclosure is mainly applied in a vehicle, the image to be displayed mainly includes data displayed on the meter in the vehicle dashboard, and the data is mainly provided to the driver for viewing so that the driver can judge the current driving condition of the vehicle, and thus the driver can drive better. Therefore, in order to be more convenient for the driver to view, assuming that the target object is the driver's eyes, it is determined whether the driver's eyes are included in the currently captured second image. It may be determined whether the currently captured second image includes a contour corresponding to the eye's contour by methods such as contour recognition, iris recognition, feature recognition, and whether the distance between the contour and the camera device is within a preset range of the distance between the driver's eye and the fixed camera device. The iris is an annular portion between the black pupil and the white sclera, which contains many detailed features of interlaced spots, filaments, crowns, stripes, crypts, and the like. The feature recognition is identical with the previous two recognition methods, i.e., it is determined whether there are the driver's eyes in the captured second image according to the set recognition feature and the distance between the feature and the camera device. It is further determined whether the driver is viewing the display carrier based on other contour features of the face, such as face, mouth, nose, eyebrow and/or ear, and eye contour features. It is further determined whether the size of the feature satisfies a preset feature ratio and whether the positional relationship between the features satisfies a preset position relationship or the like after determining that the captured second image includes one or more of the following features: face, mouth, nose, eyebrow, ear, eye, etc. After one or more determination conditions are satisfied, the target object in the second image captured by the fixed camera device is determined. Further, in order to facilitate the driver to be able to view the image while observing the front of the vehicle, a pair of eyes should be present in the captured second image. Of course, in order to facilitate the determination of the feature, the foregoing determination conditions may be applicable when the driver's image or the head feature contour information set by the user are stored in advance.

In an embodiment of the present disclosure, the target object may be the driver's eyes.

According to the foregoing examples, the target object may be the driver's eyes, and of course may be other target objects set by the user, including target objects formed by one or more of e.g., face, mouth, nose, eyebrow, ear, eyes, etc. as described previously.

Figure 6:
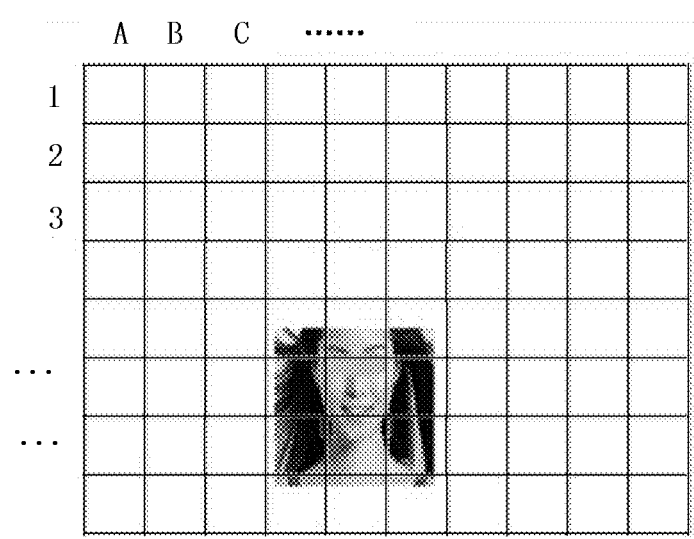
FIG. 6 is a schematic diagram of a position of a driver's head captured by a fixed camera device within a range of activity in an embodiment of the present disclosure.

As described above, before the image including the target object is captured, it is specifically required to detect whether the target object exists within the range of activity. According to an embodiment of the present disclosure, it may be sensed by e.g., a gravity sensor or an infrared sensor, whether a person exists within the range of activity, so as to detect whether the target object exists in the range of activity. A schematic diagram of the installation of the fixed camera device 1 in the vehicle is shown in FIG. 2. After the target object is detected, the camera device 1 captures an image including the target object. Specifically, when it is detected that there is a target object in the range of activity, the camera device 1 captures an image including the target object (as shown in FIG. 6), so that the position information of the target object may be determined according to the image subsequently.

Preferably, the second image including the target object is captured and the first image is captured by the same fixed camera device.

Further, the process of displaying the image on the display carrier specifically includes:

displaying the distortion corrected image on the display carrier by projection.

The image to be displayed is displayed on the display carrier by means of projection. The projection has a higher color reproduction degree, and thus has a better visual effect, thereby making the displayed image more conformable to the real object. Specifically, the image to be displayed is mainly formed by the data displayed on the meter in a vehicle dashboard. The driving speed and the remaining energy of the vehicle etc. may be displayed in the dashboard during the traveling of the vehicle, and the speed dashboard, the remaining energy dashboard, etc. will be displayed in different colors corresponding to different situations. In order that the color difference between the actual speed dashboard, the remaining energy dashboard etc. and the image that is formed by the speed dashboard, the remaining energy dashboard etc. is smaller when the driver views the image that is formed by the speed dashboard, the remaining energy dashboard etc., the projection method may be used to satisfy the driver's usage habits, etc., to reduce the impact of color changes on the driver during driving. Further, the image to be displayed is displayed on the display carrier, and the position displayed on the display carrier is set in advance (for example, a preset position). After the image to be displayed is subject to the image processing process such as distortion correction, the image to be displayed is displayed on the display carrier. Of course, for the driver to view conveniently, the preset position corresponds to the driver's eyes, so that the driver can view the image that is projected on the display carrier when he heads up and views the display carrier with his eyes, achieving the function of head-up display. For example, the target object is the driver's eyes, the display carrier is the transparent window of the vehicle, and the image to be displayed is the data displayed on the meter in the vehicle dashboard. In the distortion processing process of the image to be displayed, the distortion parameter is acquired according to the coordinate value of the eyes in the coordinate system of the fixed camera device, and the image to be displayed is processed according to the distortion processing process as previously described. When the distortion corrected image is projected on the preset position of the transparent window of the vehicle, the driver can view the data in the vehicle dashboard when heading up (not heading down). This method facilitates the driver's safe driving and has a simple processing process, and thus HUD is applicable to the conventional mass produced vehicles.

Figure 7:
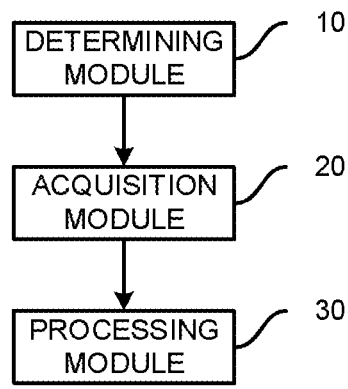
FIG. 7 is a schematic structural diagram of an exemplary embodiment of an image processing device according to the present disclosure.

The present disclosure also provides an image processing device. In an implementation, as shown in FIG. 7, the image processing device includes a determination module 10, an acquisition module 20, and a processing module 30.

The determining module 10 is configured to determine position information of a target object within a range of activity.

The acquisition module 20 is configured to acquire a distortion parameter corresponding to the position information by looking up a table.

The processing module 30 is configured to perform distortion correction processing on an image to be displayed according to the distortion parameter, so as to obtain a distortion corrected image.

The present disclosure also provides an image processing device, including a processor and a memory having a computer program stored therein, the computer program, when executed by the processor, implements steps of the image processing method according to any of the technical solutions.

According to an embodiment of the present disclosure, the memory stores a lookup table, which associates the position information within the range of activity and the corresponding distortion parameter.

The present disclosure also provides a vehicle head-up display system including a fixed camera device, a display carrier, and the image processing device as described previously.

The fixed camera device is configured to capture a second image including the target object. The image processing device is configured to determine position information of the target object according to the second image, and acquire, by using a lookup table, the distortion parameter corresponding to the position information. The image processing device is further configured to perform distortion correction processing on the image to be displayed according to the distortion parameter to obtain a distortion corrected image, and the display carrier is configured to display the distortion corrected image. Of course, the fixed camera device may also be used to capture a first image including the mobile camera device, so that the image processing device determines the capturing position information of the mobile camera device based on the first image.

Further, the vehicle head-up display system further includes a mobile camera device configured to capture a test image when the mobile camera device moves within the range of activity, wherein the image processing device is configured to compare the test image with a reference image to acquire a distortion parameter corresponding to the capturing position information where the mobile camera device captures the test image.

The present disclosure also provides a vehicle, including: the image processing device as described previously; or the head-up display system of any one of the technical solutions.

The present disclosure provides an image processing method, an image processing device, a vehicle head-up display system, and a vehicle. An image including the driver's eyes is captured by a camera device (e.g., a monocular camera device or a binocular camera device, etc.), a coordinate value (position information) of the driver's eyes in the coordinate system of the fixed camera device is determined based on the image, and is compared with position point information of the mobile camera device in the database to acquire a distortion parameter corresponding to the position information of the driver's eyes. In the preparation, the mobile camera device is used to simulate the target object to move within the range of activity (FIG. 4). FIG. 4 illustrates an image with divided moving areas. The divided grids in the image are virtual. A, B, C, . . . and 1, 2, 3, . . . identified at the edges of the grids correspond to the two-dimensional coordinate values in the coordinate system of the fixed camera device. The actual position information of the mobile camera device and the position information of the target object are three-dimensional coordinate value in the coordinate system of the fixed camera device, that is, the coordinate system of the fixed camera device being a three-dimensional coordinate system. The range of viewing angles of the driver in the moving area preferably include the range of viewing angles when the driver looks directly at the display carrier and the range of viewing angles when the driver's head moves in an effective range. FIG. 6 is an image on the fixed camera device when the driver's eyes view the display carrier, and the driver's eyes are in the range of activity. That is, FIG. 6 corresponds to the driver's eyes in the corresponding range of activity in FIG. 5. As described above, the coordinate value of a point in the imaging plane of the fixed camera device may be converted to the coordinate values in the coordinate system of the fixed camera device according to the homogeneous equation, thereby determining the coordinate value of the mobile camera device or the driver's eyes in the coordinate system of the fixed camera device. In the process of acquiring the distortion parameter, the pixel points of the same feature of the same object in the test image and the reference image are compared to determine the deviation (i.e., the distortion parameter) when the test image is corrected to the reference image, and then the distortion parameter and the position information (the coordinate value in the fixed camera device) of the mobile camera device corresponding to the distortion parameter are stored in the database in association with each other. Since the mobile camera device simulates the target object, when the position information of the target object (the coordinate value in the fixed camera device) is being determined, the distortion parameter is retrieved according to the corresponding relationship between the position information of the mobile camera device and the distortion parameter; and the distortion parameter is used for distortion processing (distortion correction) on the image to be displayed; the image to be displayed is normalized to obtain the normalized and distortion corrected image; and then the normalized and distortion corrected image is displayed on the transparent window by projection, and the position of the image that is displayed on the transparent window is fixed, thereby achieving the application of the HUD on the vehicle. The whole process is fast and simple, and the projection has a higher color reproduction degree, and has a good viewing effect. The image to be displayed is an image corresponding to data in the vehicle dashboard, or an image including the vehicle dashboard and real-time data of the dashboard. As shown in FIG. 5, the camera device 1 is arranged at the top of the vehicle in front of the driver's head to facilitate capturing an image including the driver's eyes. For the driver to view conveniently, the transparent window is preferably a windshield in front of the vehicle.

It should be noted that, in an embodiment of the present disclosure, the display carrier may be a transparent window of a vehicle, water molecules in the air, or the like.

In an embodiment of the present disclosure, the image to be displayed can be displayed on the display carrier normally and with a higher quality, and the driver can normally view the image at different viewing positions in the window region, thereby solving the problem of a poor display effect.

In an embodiment of the present disclosure, the range of activity is processed in advance by storing the distortion parameter and the corresponding position information in an association relationship in the database, which facilitates to acquire the corresponding distortion parameter by matching the stored position information after the position information of the target object (for example, an eye) in the coordinate system of the fixed camera device is determined. This simplifies the process of acquiring the distortion parameter, and shortens the time for acquiring the distortion parameter, which facilitates the application of the head-up display technology.

In an embodiment of the present disclosure, the target object (the eye) is tracked by the camera device, and the position information of the target object is determined based on the image including the target object captured by the capture device. The camera device may be the existing camera device in the vehicle, which may achieve the head-up display of the vehicle without increasing the members inside the vehicle, thereby saving the accommodation space inside the vehicle.

In an embodiment of the present disclosure, the distortion parameter is stored in advance in the micro control unit or the database, which saves the calculation time of the head-up displayed image, and can quickly determine the position of the image to be displayed. In addition, various functional units in various embodiments of the present disclosure may be integrated into one processing module, or may exist physically separately, or two or more units may be integrated into one module. The above integrated modules can be implemented in the form of hardware or in the form of software functional modules. The integrated modules, if implemented in the form of software functional modules and sold or used as stand-alone products, may also be stored in a computer readable storage medium.

The above mentioned storage medium may be a read only memory, a magnetic disk or an optical disk or the like.

Figure 8:
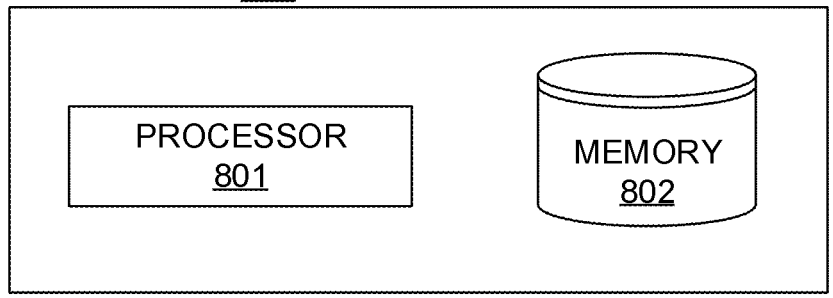
FIG. 8 schematically shows a structural block diagram of an image processing device 800 according to an exemplary embodiment of the present disclosure.

The structure of an image processing device according to an exemplary embodiment of the present disclosure will be described below with reference to FIG. 8. FIG. 8 schematically shows a structural block diagram of an image processing device 800 according to an exemplary embodiment of the present disclosure. The image processing device 800 may be used to perform the method described with reference to FIG. 1 or the method described with reference to FIG. 3. For the sake of brevity, only the schematic structure of the image processing device according to an exemplary embodiment of the present disclosure will be described herein, and the details already detailed in the method described above with reference to FIG. 1 or 3 will be omitted.

As shown in FIG. 8, the image processing device 800 includes a processing unit or processor 801, which may be a single unit or a combination of a plurality of units for performing various operations; and a memory 802 in which computer executable instructions are stored. The instructions, when executed by the processor 801, cause the processor 801 to perform the steps of the above methods in accordance with the present disclosure.

The above description is only a part of embodiments of the present disclosure. It should be noted that the skilled in the art can also make some improvements and retouching without departing from the principle of the present disclosure, which should be considered as falling into the protection scope of the present disclosure.

We claim:

1. An image processing method applied to a vehicle head-up display device, comprising:
    determining position information of a target object within a range of activity;
    acquiring a distortion parameter corresponding to the position information by looking up a table; and
    performing distortion correction processing on an image to be displayed according to the distortion parameter, so as to obtain a distortion corrected image,
    wherein prior to said determining the position information of the target object within the range of activity, the image processing method further comprises:
    determining capturing position information of a mobile camera device within the range of activity;
    determining a distortion parameter corresponding to the capturing position information, and storing the capturing position information in association with the corresponding distortion parameter; and
    moving the mobile camera device within the range of activity, so as to store position information within the range of activity in association with a distortion parameter corresponding to the position information.

2. The image processing method according to claim 1, wherein said determining the capturing position information of the mobile camera device within the range of activity comprises:
    capturing, by a fixed camera device, a first image of the mobile camera device within the range of activity;
    parsing the first image to determine imaging position information of the mobile camera device in an imaging plane of the fixed camera device; and
    converting the imaging position information to determine the capturing position information of the mobile camera device within the range of activity.

3. The image processing method according to claim 1, wherein said acquiring the distortion parameter corresponding to the capturing position information comprises:

capturing a test image by the mobile camera device; and comparing the test image with a reference image to acquire the distortion parameter corresponding to the capturing position information.

4. The image processing method according to claim 1, wherein said storing the capturing position information in association with the corresponding distortion parameter further comprises:

storing the capturing position information and the corresponding distortion parameter in a lookup table.

5. The image processing method according to claim 1, wherein the range of activity is an area in which the image to be displayed can be viewed by the target object when it is displayed on a display carrier.

6. The image processing method according to claim 1, wherein prior to said determining the position information of the target object within the range of activity, the method comprises:

detecting whether there is a target object within the range of activity; and in response to detecting that there is a target object within the range of activity, capturing an image including the target object.

7. The image processing method according to claim 6, wherein said detecting whether there is a target object within the range of activity further comprises:

sensing, by a sensor, whether there is a target object within the range of activity.

8. The image processing method according to claim 7, wherein the sensor comprises one or more of an infrared sensor and a gravity sensor.

9. The image processing method according to claim 1, further comprising:

displaying the distortion corrected image on a display carrier by projection.

10. An image processing device, comprising a processor and a memory having a computer program stored therein, the computer program, when executed by the processor, causes the image processing device to:

determine position information of a target object within a range of activity;

acquire a distortion parameter corresponding to the position information by looking up a table; and perform distortion correction processing on an image to be displayed according to the distortion parameter, so as to obtain a distortion corrected image, wherein the computer program, when executed by the processor, further causes the image processing device to: prior to said determining the position information of the target object within the range of activity, determine capturing position information of a mobile camera device within the range of activity;

determine a distortion parameter corresponding to the capturing position information, and storing the capturing position information in association with the corresponding distortion parameter; and move the mobile camera device with the range of activity, so as to store position information within the range of activity in association with a distortion parameter corresponding to the position information.

11. The image processing device according to claim 10, wherein the memory stores a lookup table, which associates the position information within the range of activity and the corresponding distortion parameter.

12. A vehicle head-up display system, comprising a fixed camera device, a display carrier and the image processing device of claim 10, wherein the fixed camera device is configured to capture a second image including the target object, the image processing device is configured to determine the position information of the target object according to the second image, acquire the distortion parameter corresponding to the position information by looking up the table, and perform the distortion correction processing on the image to be displayed according to the distortion parameter so as to obtain the distortion corrected image, and the display carrier is configured to display the distortion corrected image.

13. The vehicle head-up display system according to claim 12, further comprising a mobile camera device configured to capture a test image when the mobile camera device moves within the range of activity, wherein the image processing device is configured to compare the test image with a reference image to acquire a distortion parameter corresponding to the capturing position information where the mobile camera device captures the test image.

14. The image processing device according to claim wherein the computer program, when executed by the processor, further causes the image processing device to:

capture, by a fixed camera device, a first image of the mobile camera device within the range of activity;

parse the first image to determine imaging position information of the mobile camera device in an imaging plane of the fixed camera device; and convert the imaging position information to determine the capturing position information of the mobile camera device within the range of activity.

15. The image processing device according to claim 10, wherein the computer program, when executed by the processor, further causes the image processing device to:

capture a test image by the mobile camera device; and compare the test image with a reference image to acquire the distortion parameter corresponding to the capturing position information.

* * * * *